Jan. 27, 1970      W. ZAHN      3,492,070

ILLUMINATING SYSTEM FOR A COPYING APPARATUS

Filed Nov. 23, 1965      2 Sheets-Sheet 1

INVENTOR.
WOLFGANG ZAHN

BY Michael S. Striker
Attorney

Jan. 27, 1970     W. ZAHN     3,492,070
ILLUMINATING SYSTEM FOR A COPYING APPARATUS
Filed Nov. 23, 1965     2 Sheets-Sheet 2

INVENTOR.
WOLFGANG ZAHN

United States Patent Office 3,492,070
Patented Jan. 27, 1970

3,492,070
ILLUMINATING SYSTEM FOR A COPYING APPARATUS
Wolfgang Zahn, Munich, Germany, assignor to Agfa-Gevaert Aktiengesellschaft, Leverkusen, Germany
Filed Nov. 23, 1965, Ser. No. 509,354
Claims priority, application Germany, Nov. 24, 1964,
A 47,677, A 22,786
Int. Cl. G03b 27/54, 27/26
U.S. Cl. 355—37   17 Claims

ABSTRACT OF THE DISCLOSURE

A photographic copying apparatus having a plurality of light sources of different colors, light guiding members for each of the light sources, and a light mixing tunnel for receiving the light from each of the guiding members and projecting it as white light onto a picture carrier. A supporting element is provided at one end of the light mixing tunnel for holding the color negative which is being copied, and a plurality of dichroic mirrors, each associated with different basic color components, are provided at the opposite end of the tunnel, intermediate the tunnel and the light guiding members, for projecting the respective color components of the received light along separate paths into the mixing tunnel. The light guiding members and the mixing tunnel have inner reflecting surfaces for reflecting the light as it passes through the respective members and the tunnel. The mixing tunnel has dispersion elements at both ends thereof for dispersing the light to produce a uniform illumination of the negative. The dichroic mirrors are permeable to heat radiation and have heat absorbing elements associated with each one of the mirrors so that no heat radiation may enter the mixing tunnel and be dissipated therein.

---

The present invention relates to an illuminating system for a copying apparatus, and more particularly to an illuminating system for a copying apparatus for color photography.

Illuminating systems are known in which a light guiding means having inner reflecting surfaces is used together with a dispersing member between a lamp and the support of the carrier of the photographic picture which is to be copied. According to the prior art, a condenser system is provided which collects the light on the picture carrier. The disadvantage of such an arrangement is that the light is not soft enough to prevent the copying of scratches and dust particles onto the photographic print.

It is one object of the invention to overcome this disadvantage and to provide a copying apparatus which produces very soft white light.

Another object of the invention is to provide a copying apparatus for color photography producing a very soft light.

It is known to produce mixed light as is necessary for making photographic color prints by mixing colored rays in a mixing chamber having inner diffusing surfaces for scattering the colored light before the same passes through a translucent dispersing member to the photographic picture carrier. This construction produces very soft light, but the diffusing reflecting surfaces absorb a very great amount of light, and since repeated diffusion and irregular reflection takes place in the mixing chamber in which the light rays of different colors are combined, very great losses of light result, and the efficiency of the system is low.

It is another object of the invention to overcome this disadvantage of known illuminating systems for color photography, and to provide an illuminating system for color photography operating at great efficiency and with small light losses.

With these objects in view, the present invention mainly relates to an improvement of the illuminating system of a copying apparatus. One embodiment of the invention comprises means for supporting a photographic picture carrier, such as a negative; light guiding and mixing means having an inner mixing chamber bounded by mirror reflecting surfaces and having one end located in the region of the picture carrier; light dispersing means in said mixing chamber; and illuminating means including at least one source of light and light guiding means connecting the source with the other end of the mixing chamber whereby light entering the mixing chamber is reflected and dispersed on the picture carrier.

The light guiding means is preferably a light tunnel of small cross section, and the light guiding and mixing means is preferably a light tunnel of greater cross section corresponding to the format of the picture carrier to be copied. When the illuminating system is used for color photography, three color filters, associated with the basic colors, are provided. In one embodiment of the invention, the color filters are alternately placed in the operative position located between the illuminating means, and the inlet opening of the mixing chamber. In another embodiment of the invention, the illuminating means include three sources of light, respectively associated with the basic colors, three light guiding means respectively associated with the three light sources, and three color filters arranged in the inlet opening of the mixing chamber.

Preferably, translucent dispersing members are provided at the inlet and outlet end of the mixing chamber. An apparatus of this type has very small absorption losses since the light is reflected by the reflecting surfaces of the mixing chamber, and not diffused. Nevertheless, the combined light of the several colored light sources is white and very soft.

It is advantageous to make the light guiding and mixing means exchangeable light tunnels of different cross section corresponding to different formats of negatives, so that, irrespective of the size of the negative, optimal light efficiency is obtained.

In the preferred embodiment of the invention, the dispersing means provided adjacent the picture carrier, is a translucent member having a spherical refractive surface facing toward the mixing chamber, and a planar surface confronting the photographic picture carrier. In this manner, the light density and intensity can be increased toward the marginal portions of the negative to compensate for a vignetting effect caused by the objective.

Preferably, the light source is an ellipsoid reflector lamp arranged with the focal points thereof located in the light guiding tunnel leading to the mixing chamber. Ellipsoid reflector lamps are known for motion picture apparatus and have a very high light output, and a small focal spot.

It is preferred to provide an elongated prismatic light tunnel between each lamp and the mixing chamber, since in this manner great amounts of light can be guided through small cross sections. The small cross sections also permit the provision of shutters operated by electromagnetic means between the lamps and the light tunnels. In the embodiment of the invention in which only one lamp and prismatic light tunnel is provided, and in which three color filters are selectively placed in the path of the rays, at least three color filters in the additive or subtractive basic colors are used, which can be singly, or several together, placed in the region of the inlet opening of the mixing chamber.

In another embodiment of the invention where three lamps and three prismatic light tunnels are used, the three light tunnels are located angularly spaced from each other in a plane perpendicular to the longitudinal extension of the mixing chamber.

In the embodiment of the invention using only a single lamp and a single light tunnel, the latter extends perpendicularly to the longitudinal extension of the mixing chamber.

This arrangement permits the use of a partly radiation permeable mirror in front of each light tunnel, and being disposed at an angle of 45° to the light tunnel and to the mixing chamber so that light leaving the light tunnel, or light tunnels, is reflected into the inlet opening of the mixing chamber. In the embodiment in which three sources of light of different color are used, the mirrors are selected so that each mirror mainly reflects light having the color of the associated source of light, and permits the passage of other radiations, particularly of heat radiation so that no heat rays are reflected into the mixing chamber. Light filters for the respective three basic colors are disposed between the three reflecting mirrors and the inlet opening of the mixing chamber and receive, respectively, radiation of different colors, but practically no heat radiation so that they are not substantially heated. The three filters are arranged within the area of the inlet opening the mixing chamber without overlapping, and adjacent a dispersing member which closes the inlet opening of the mixing chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
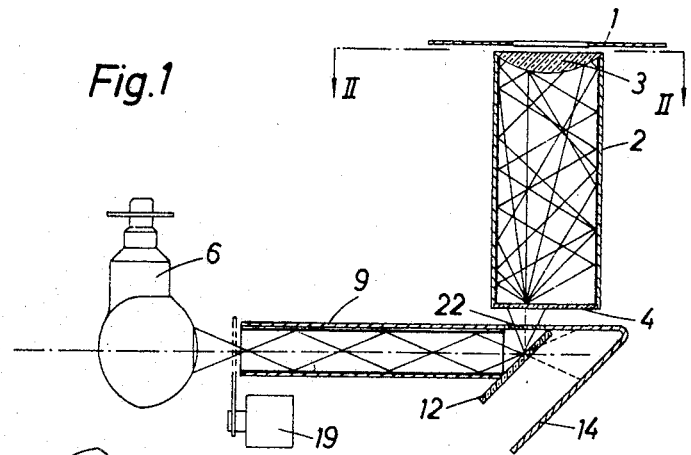
FIG. 1 is a side elevation, partially in section along line I—I in FIG. 2, and illustrating an embodiment of the invention suitable for color photography.

Referring now to the drawings, and more particularly to FIG. 1, supporting means 1 form part of the structure of a copying apparatus of the usual construction, not shown. A photographic picture carrier, such as a negative color film is supported by supporting means 1. The upper end of a light guiding and mixing means 2, shown to be a four-sided prismatic light tunnel, is disposed directly under the supporting means 1, and has a rectangular cross section slightly larger than the picture carrier to be illuminated. The planar inner surfaces of light tunnel 2 are highly reflecting mirrors. The upper end of light tunnel 2 is closed by a dispersing means 3, shown to have a planar outer surface, and a spherical convex inner surface confronting the chamber within light tunnel 2. The dispersing means 3 preferably consists of a white translucent material. The increased thickness of the center portion of the dispersing means 3 causes an increase in the light density and light intensity in the marginal portions of the photographic picture carrier supported on supporting means 1 so that the vignetting caused by the objective is compensated. Another flat light dispersing plate closes the lower end of light tunnel 2, and may consist of ground glass, frosted glass, or of a white translucent synthetic material.

Figure 2:
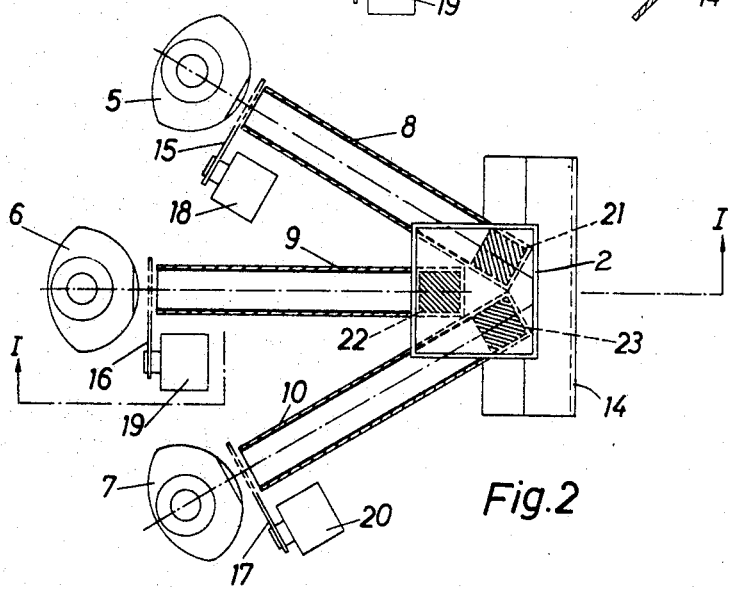
FIG. 2 is a plan view, partially in section along line II—II in FIG. 1.

As best seen in FIG. 2, three illuminating means are associated with different basic colors are located in a horizontal plane perpendicular to the longitudinal extension of light tunnel 2. Three lamps 5, 6, 7, which are preferably ellipsoid reflector lamps known from motion picture apparatus, have focal points located within light guiding means 8, 9, 10, respectively, each of which is a prismatic tube having a cross section substantially corresponding to the area of the focal light spot of the respective lamp. The inner planar surfaces of the prismatic light guiding means 8, 9, 10 are planar mirror reflecting surfaces.

At the ends of light guiding means 8, 9, 10, reflecting means 12 are arranged, of which only reflecting means 12 cooperating with light guiding means 9 is shown in FIG. 1. Each reflecting means 12 is a plate reflecting for the respective light emitted by the lamp associated with the corresponding light guiding means, for example, if lamp 6 emits a light of a certain color, the corresponding reflecting mirror 12 will mainly reflect light of this color but will permit other radiation, particularly heat radiation to pass therethrough. Radiation passing through the three mirrors 12 is absorbed by a blackened heat absorbing means 14 which is located rearwardly of the respective partly reflecting mirror 12.

Mirrors 12 are positioned at an angle of 45° to the horizontal plane of the illuminating means and to the longitudinal extension of the light tunnel 2, so as to reflect the light into the inner chamber of light tunnel 2. Between dispersing member 4, and each mirror 12, a color filter is arranged, the three color filters 21, 22, 23 being best seen in FIG. 2. The cross sectional area of light tunnel 2 and dispersing member 4, and the areas of color filters 21, 22, 23 are selected so that all three color filters are located within the cross sectional area of light tunnel 2 and permit the passage of three differently colored light beams through dispersing member 4 into the mixing chamber in light tunnel 2. The mirror reflecting surfaces of the mixing chamber in light tunnel 2 reflect the light rays several times, and cause a thorough mixing of the differently colored lights entering the light tunnel.

Shutter means 15, 16 and 17 are provided between the lamps 5, 6, 7 and the ends of light guiding means 8, 9, 10, and are operated by electromagnetic means 18, 19 and 20 which are energized by the control device of the copying apparatus, now shown.

The light emitted by lamps 5, 6, 7 is mainly thrown into the light guiding tunnels 8, 9, 10 since the focal points of the reflectors of lamps 5, 6, 7 are located within the respective light guiding tunnel 8, 9, 10. The light is guided within light tunnels 8, 9, 10 with very low losses toward the selectively reflecting mirrors 12, where the light is already of very uniform density. The respective radiation is reflected onto the respective color filters 21, 22, 23, and enters through dispersing member 4 into the mixing chamber.

The selectively reflecting mirrors permit passage of radiation, except radiation of the respective basic color, so that substantially only radiation of the respective basic color reaches the corresponding color filter where a very precise filtering to the desired basic color takes place.

Heat radiation produced by lamps 5, 6, 7 is absorbed by absorbing means 14 after having passed through mirrors 12, so that the color filters 21, 22, 23 are not substantially heated.

Dispersing member 4 throws the three color spots produced by mirrors 12 and color filters 21, 22, 23 in dispersed condition into the mixing chamber within light tunnel 2. Due to the reflection at many different angles by the inner mirror surfaces of the light tunnel 2, the color components are thoroughly mixed along the length of light tunnel 2, without any substantial losses due to absorption since the mirror surfaces produce total reflection. When the color filters are suitably selected, uniformly white soft light passes through dispersing means 3.

Figure 3:
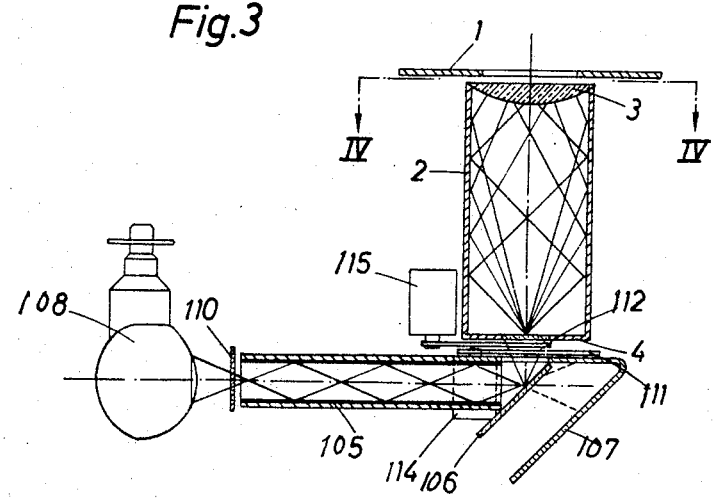
FIG. 3 is a side elevation, partially in section along line III—III in FIG. 4.
Figure 4:
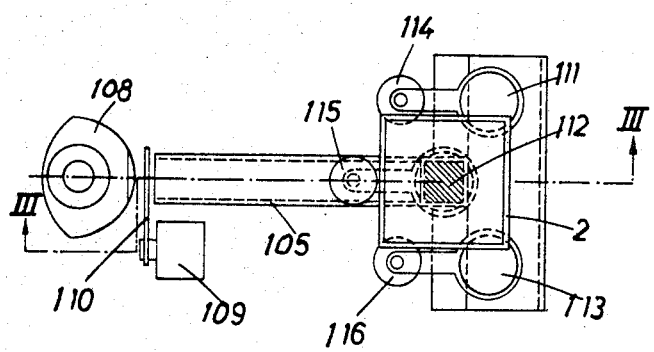
FIG. 4 is a plan view, partially in section along line IV—IV in FIG. 3.

The embodiment illustrated in FIGS. 3 and 4 includes a light guiding and mixing means 2 with an inner mixing chamber closed at the upper end by a light dispersing member 3 which is located opposite a support 1 for a photographic picture carrier, particularly a color negative. The cross section of light tunnel 2 and dispersing member 3 is slightly greater than the area of the color negative. The inner surfaces of light tunnel 2 are mirror reflecting surfaces, as described with reference to FIG. 1.

A flat dispersing plate 4 closes the inlet opening at the lower end of light tunnel 2, and consists of ground glass or white translucent synthetic material, as described with reference to FIG. 1.

Perpendicularly to the axis of light tunnel 2, a light guide means or light tunnel 105 is disposed, which has four planar mirror reflecting surfaces. A reflecting mirror 106 is arranged at an angle of 45° to the axis of light tunnel 105 and to the axis of light tunnel 2, so that light emitted by the ellipsoid reflector lamp 108 and passing through light tunnel 105 is reflected toward the inlet opening of the mixing chamber in light tunnel 2. Mirror 106 is designed to reflect the visible spectrum of light, and to permit other radiation to pass therethrough, particularly heat radiation. A blackened absorbing member 107 is disposed behind mirror 106, and absorbs and dissipates the heat radiation passing through mirror 106. The heat absorbed by member 107 is discharged by convection and radiation.

If the apparatus shown in FIGS. 3 and 4 is used for black and white copies, white light is emitted by lamp 108, passes through light tunnel 105, being reflected by the planar mirror reflecting surfaces thereof, and reaches with very low losses reflecting mirror 106 where heat radiation is eliminated. The visible part of the spectrum falls onto the dispersing plate 4 forming on the same a bright spot, which may be substantially smaller than the cross section of light tunnel 2. Due to the multiple reflection on the mirror reflecting inner planar surfaces of light tunnel 2, dispersing member 3 is very uniformly illuminated, and a negative on supporting means 1 is illuminated by rays dispersed by the convex dispersing member 3 in such a manner that the intensity of the rays increases toward the outer portions of dispersing member 3 and the marginal portions of the negative so that vignetting is prevented.

An electromagnetic means 109 operates a shutter 110 to close and open the inlet end of the light tunnel 105. Since the bundle of rays is narrow at this point, comparatively little power is needed for operating the small shutter.

If the apparatus of FIGS. 3 and 4 is to be used for color photography, three movable color filters 111, 112, 113 are provided in the region of the lower end of light tunnel 2 and are operable by electromagnetic means 114, 115, and 116 in accordance with command impulses received from a color control apparatus of the type disclosed in the German Patent 972,204. Color filters 111, 112, 113 have three different basic colors, which may be additive (red, green, blue) or subtractive (cyan, purple, yellow).

Since the cross section of the beam of light is still small at this point, comparatively small color filters can be used, which can be moved into and out of a position located in the path of rays by comparatively small electromagnetic means.

It will be understood that each of the elements described above, or two or more together, may also find a useful application in other types of illuminating system for photographic copying apparatus differing from the types described above.

While the invention has been illustrated and described as embodied in an illuminating system for color photography, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art.

What is claimed as new and desired to be secured by Letters Patent is:

1. Photographic copying apparatus, comprising in combination, supporting means for a photographic picture carrier; light guiding tunnel means having peripheral wall means with an inner peripheral reflecting surface, and having one end located in the region of said supporting means and of said picture carrier, the other end of said tunnel means having a predetermined cross sectional area; a plurality of illuminating means, each including a source of light, and light guiding means for guiding light into the region of said other end of said tunnel means; and a plurality of dichroic mirror means respectively associated with different basic color components located at said other end opposite different portions of said cross sectional area of said tunnel means and receiving light from said plurality of light guiding means, respectively, and being disposed for projecting the respective color components of the received light along separate paths into said other end so that said color components are reflected and mixed by said inner peripheral reflecting surface of said tunnel means and projected as white light onto the picture carrier.

2. Copying apparatus as claimed in claim 1 wherein said wall means of said tunnel means includes a plurality of peripheral planar walls having planar mirror reflecting faces forming said inner peripheral reflecting surface of said tunnel means.

3. Copying apparatus as claimed in claim 1 wherein said tunnel means includes a first dispersing member at said other end located across said separate paths of said color components so that separate parts of said first dispersing member are illuminated by the same, and disperse the color components toward said inner peripheral reflecting surface of said tunnel means; and a second dispersing member located at said one end of said tunnel means and being convex toward said other end for uniformly distributing white light on said picture carrier.

4. Photographic copying apparatus comprising, in combination, supporting means for a photographic picture carrier; light guiding tunnel means extending in one direction and having peripheral wall means with an inner peripheral reflecting surface and having one end located in the region of said supporting means and of said picture carrier, the other end of said tunnel means having a predetermined cross sectional area; a plurality of illuminating means, each including a source of light, and light guiding means for guiding light into the region of said other end of said tunnel means; and a plurality of dichroic mirror means located in a common plane perpendicular to said one direction and equally spaced from said supporting means, said dichroic mirror means being respectively associated with different basic color components and located at said other end opposite different portions of said cross sectional area of said tunnel means and receiving light from said plurality of light guiding means, respectively, and being disposed for projecting the respective color components of the received light along separate paths into said other end so that said color components are reflected and mixed by said inner peripheral reflecting surface of said tunnel means and projected as white light onto the picture carrier.

5. Photographic copying apparatus, comprising, in combination, supporting means for a photographic picture carrier; light guiding tunnel means having peripheral wall means with an inner peripheral reflecting surface, and having one end located in the region of said supporting means and of said picture carrier, the other end of said tunnel means having a predetermined cross sectional area; a plurality of illuminating means, each including a source of light, and light guiding means for guiding light into the region of said other end of said tunnel means; and a plurality of dichroic mirror means respectively associated with different basic color components located at said other end opposite different portions of said cross sectional area of said tunnel means and receiving light from said plurality of light guiding means, respectively, and being disposed for projecting the respective color components of the received light along separate paths into said other end so that said color components are reflected and mixed by said inner peripheral reflecting surface of said tunnel means and projected as white light onto the picture carrier, each of said light guiding means including a light guiding tunnel having peripheral wall means with an inner peripheral reflecting surface and extending between the respective source of light and the respective dichroic mirror means.

6. Copying apparatus as claimed in claim 5 wherein said tunnel means extends in one direction; and wherein said light guiding tunnels of said illuminating means, and said plurality of dichroic mirror means are located in a common plane transverse to said one direction.

7. Photographic copying apparatus, comprising, in combination, supporting means for a photographic picture carrier; light guiding tunnel means having peripheral wall means with an inner peripheral reflecting surface, and having one end located in the region of said supporting means and of said picture carrier, the other end of said tunnel means having a predetermined cross sectional area; a plurality of illuminating means, each including a source of light, and light guiding means for guiding light into the region of said other end of said tunnel means; a plurality of dichroic mirror means respectively associated with different basic color components located at said other end opposite different portions of said cross sectional area of said tunnel means and receiving light from said plurality of light guiding means, respectively, and being disposed for projecting the respective color components of the received light along separate paths into said other end so that said color components are reflected and mixed by said inner peripheral reflecting surface of said tunnel means and projected as white light onto the picture carrier; and a dispersing member at said other end of said tunnel means located across said separate paths of said color components so that separate parts of said dispersing member are illuminated by the same and disperse the color components toward said inner peripheral reflecting surface of said tunnel means.

8. Copying apparatus as claimed in claim 7 and comprising another dispersing member located at said one end of said tunnel means and being convex toward said other end for uniformly distributing white light on said picture carrier.

9. Copying apparatus as claimed in claim 7 wherein said dichroic mirror means are constructed to be permeable to heat radiation so that the same does not enter said tunnel means and is dissipated.

10. Photographic copying apparatus, comprising, in combination, supporting means for a photographic picture carrier; light guiding tunnel means having peripheral wall means with an inner peripheral reflecting surface, and having one end located in the region of said supporting means and of said picture carrier, the other end of said tunnel means having a predetermined cross sectional area; a plurality of illuminating means, each including a source of light, and light guiding means for guiding light into the region of said other end of said tunnel means, each of said light guiding means including a tunnel having a plurality of peripheral walls with inner planar reflecting faces; and a plurality of dichroic mirror means respectively associated with different basic color components located at said other end opposite different portions of said cross sectional area of said tunnel means and receiving light from said plurality of light guiding means, respectively, and being disposed for projecting the respective color components of the received light along separate paths into said other end so that said color components are reflected and mixed by said inner peripheral reflecting surface of said tunnel means and projected as white light onto the picture carrier.

11. Photographic copying apparatus comprising, in combination, supporting means for a photographic picture carrier; a first light guiding tunnel having peripheral wall means with an inner peripheral reflecting surface, and having one end located in the region of said supporting means and of said picture carrier; illuminating means including a source of light and a second light guiding tunnel having peripheral wall means with an inner reflecting surface for guiding light into the region of the other end of said first tunnel means, said second tunnel extending transverse to said first tunnel; a mirror for reflecting light from said second tunnel into said other end of said first tunnel; a plurality of color filters respectively associated with different basic color components; and electromagnetic operating means for moving said filters to and from filtering positions located between said mirror and said other end of said first tunnel.

12. Copying apparatus as claimed in claim 11 wherein the cross sectional area of said other end of said first tunnel is greater than the area of said mirror and of each of said filters; including a dispersing member at said other end located across said cross section and receiving light from said mirror through one of said filters on a part thereof for dispersing said light to said inner peripheral reflecting surface of said first tunnel, and another dispersing member at said one end of said first tunnel for projecting white light onto said picture carrier.

13. Copying apparatus as claimed in claim 12 wherein each of said peripheral wall means of said first and second tunnels has a plurality of planar peripheral walls having planar reflecting faces.

14. Photographic copying apparatus comprising, in combination, supporting means for a photographic picture carrier; light guiding and mixing means having an inner mixing chamber bounded by mirror reflecting surfaces and having one end located in the region of said supporting means and of said carrier; light dispersing means located at said one end of said mixing chamber; illuminating means including at least one source of light and a light guiding means extending between said source of light and said other end of said mixing chamber transversely to the same; and at least one partly radiation permeable mirror located in the region of said other end for reflecting a selected part of the radiation from said light guiding means toward said other end of said mixing chamber; and radiation absorbing means located behind said mirror for absorbing and dissipating heat radiation passing through said mirror.

15. Copying apparatus as claimed in claim 14 wherein said light guiding means of said illuminating means includes a light guiding tunnel having an inner reflecting surface; and wherein said mirror is inclined to the direction of said light guiding tunnel.

16. In a photographic copying apparatus, in combination, supporting means for a photographic picture carrier; a light guiding and mixing tunnel means having an inner mixing chamber bounded by mirror reflecting surfaces and having one end located in the region of said supporting means and of said carrier, said one end having a cross section at least as large as the area of said carrier; and means at the other end of said tunnel means for projecting dispersed light from an area smaller than said cross section of said other end toward said mirror reflecting surfaces so that the same reflect and project the light through the entire cross section at said one end whereby the entire area of said carrier is uniformly illuminated, said means for projecting dispersed light including a light dispersing member at said other end of said tunnel means, at least one source of light, and a mirror for reflecting the light of said source into said other end and onto said dispersing member, and being slanted to the axis of said tunnel means, said mirror having such an area that the light reflected by the same forms an illuminated spot on said dispersing member which has said area smaller than the cross section of said tunnel means at said one end.

17. An apparatus as claimed in claim 16 and including another dispersing member extending across the entire cross section of said tunnel means at said one end for dispersing the light passing through the entire cross section at said other end onto said picture carrier.

References Cited

UNITED STATES PATENTS

| | | | |
|---|---|---|---|
| 733,090 | 7/1903 | Szczepanik | 88—24 |
| 2,590,240 | 3/1952 | Epstein | 350—169 XR |
| 2,983,183 | 5/1961 | Pickering | 88—24 XR |
| 3,273,451 | 9/1966 | Wilson | 88—24 |
| 3,322,025 | 5/1967 | Dauser | 88—24 XR |
| 3,336,835 | 10/1967 | Evensen et al. | 88—24 |
| 2,438,219 | 3/1948 | Johnston | 355—37 |
| 3,135,471 | 6/1964 | Clapp | 240—3.1 |

FOREIGN PATENTS 943,562   12/1963   Great Britain.

NORTON ANSHER, Primary Examiner

F. L. BRAUN, Assistant Examiner

U.S. Cl. X.R.
355—70